United States Patent [19]
Lester et al.

[11] Patent Number: 6,002,763
[45] Date of Patent: Dec. 14, 1999

[54] TELEPHONE WITH A MUTE RINGER FUNCTION HAVING AN AUTOMATIC RINGER REACTIVATION CAPABILITY

[75] Inventors: Leland Lester; David Iglehart; Elie Antoun Jreij, all of Austin; James Umstetter, Round Rock, all of Tex.

[73] Assignee: Siemens Information and Communication Networks, Inc., Boca Raton, Fla.

[21] Appl. No.: 09/017,399

[22] Filed: Feb. 2, 1998

[51] Int. Cl.$^6$ .................................................. H04M 1/00
[52] U.S. Cl. ......................................... 379/421; 379/373
[58] Field of Search .................................. 379/421, 373, 379/375, 252, 199, 376, 377, 188

[56] References Cited

U.S. PATENT DOCUMENTS

| | | | |
|---|---|---|---|
| 5,191,607 | 3/1993 | Meyers et al. | 379/421 |
| 5,317,632 | 5/1994 | Ellison | 379/199 |
| 5,604,797 | 2/1997 | Adcock | 379/373 |

OTHER PUBLICATIONS

Siemens "Optiset NI–12 Family Desktop Terminal User Guide," Aug. 1997, p. 62.

*Primary Examiner*—Jack Chiang

[57] ABSTRACT

A telephone with a mute ringer function having an automatic disabling feature includes multiple call indicators including a ringer. A power output reducing device is connected to the ringer to reduce the ringer volume prior to a connection between the telephone and a remotely located telephone. A volume switch control unit is connected to the power output reducing device to reset the ringer volume to a level established prior to a volume reduction upon detecting either connectivity to the remotely located telephone or the termination of the connection. A selecting device selects an incoming call indicator prior to the connection to the remote telephone. A reverting device automatically reverts power to a previously selected incoming call indicator upon either establishing connectivity for the call or the termination of the call. In a preferred embodiment, the ringer power output reducing device and the ringer power output resetting device include a volume switch connected to the ringer.

19 Claims, 4 Drawing Sheets

TELEPHONE WITH A MUTE RINGER FUNCTION HAVING AN AUTOMATIC RINGER REACTIVATION CAPABILITY

BACKGROUND OF THE INVENTION

The invention relates generally to an apparatus and method for muting a telephone ringer, and more specifically to an apparatus and method for selectively muting a telephone ringer prior to a telephone call.

DESCRIPTION OF THE RELATED ART

Cellular telephones provide a portable means for accessing telecommunications networks. Partially as a consequence of the convenience provided by the portability of cellular telephones, the use of cellular phones has proliferated. However, certain differences between conventional landline telephones and cellular telephones have raised problems previously not encountered in the use of conventional landline telephones.

For instance, when a user enters and subsequently transmits a dial string from a cellular telephone, there is a latency period during which the dial string data is received and processed by a central office. Once the central office has processed the dial string data and routed the call, the latency period terminates and a connection is established between the cellular telephone and a remotely located telephone. During the latency period, the cellular telephone can still receive a call from another telephone. A common practice for many users is to place the cellular telephone to an ear after depressing the send key in order to monitor the earpiece for a response from the called party. A problem arises when an incoming call is received during the latency period while a user is monitoring the earpiece. The activation of the ringer by the incoming call causes a potentially painful sensation for the user, because the user's ear is in such a close proximity to the ringer. The ringer design and volume settings of many cellular phones were not formulated to take into account the possibility that a user might place the ringer so close to the ear of the user contemporaneous to reception of an incoming call.

Conventional ringer silencers, such as the one described in U.S. Pat. No. 5,317,632 to Ellison, provide a means for silencing a ringer for a user-determined time period during which a user does not wish to be disturbed by telephone calls. The ringer silencer in this invention is effective for its intended purpose; however, a user is required to manually activate and possibly deactivate the ringer for use in remedying the previously described latency period cellular telephone problem. Consequently, a user might forget to activate the ringer silencer. In addition, the user might set an excessively long time interval for the ringer silencer, thereby unintentionally screening out telephone calls.

U.S. Pat. No. 5,191,607 to Meyers et al. describes a communication control console center with a ring tone mute function. When the ring tone mute function is activated and an incoming telephone call is received, the call rings through until either the caller disconnects or a user answers the call. If a second incoming call is then received while the ring tone mute function is activated, the ringer does not sound. The ring tone mute function can be programmed to terminate upon either expiration of a timing sequence or termination of the first telephone call. The Meyers et al. invention provides an effective mute ringer function for screening incoming calls from a second line while a user is taking a call on the first line. However, the invention is not effective for muting the ringer during the above-described latency period prior to a telephonic connection on a cellular telephone. The ring tone mute function only mutes the ringer after a first connection has been established. Consequently, an incoming call during the latency period will not be muted.

What is needed is a cellular telephone with a mute ringer capability which prevents a ringer from ringing at full volume during a latency period prior to a connection to a remote telephonic device.

SUMMARY OF THE INVENTION

A telephone with a mute ringer function having an automatic disabling feature includes at least one incoming call indicator in addition to a ringer. A power output reducing device is connected to the ringer to reduce the ringer volume prior to a connection between the telephone and a remotely located telephone. An automatic reset device is also connected to the ringer to reset the ringer volume to a level established prior to a volume reduction upon detecting either an establishment of the connection to the remotely located telephone or the termination of the connection. A selecting device selects an incoming call indicator prior to the connection to a remote telephone. A reverting device automatically reverts power to a previously selected incoming call indicator upon either the establishment of the connection to the remote telephone or the termination of the connection.

In a preferred embodiment, the ringer power output reducing device and the ringer power output resetting device include a volume switch connected to the ringer. A volume switch control unit is configured for transmission of volume reduction signals to the volume switch prior to a connection of the telephone to a remotely located telephonic device and for transmission of volume amplification signals upon termination of the connection.

Alternatively, the ringer power output reducing device and the ringer power output resetting device include a call control unit communicatively connected to a call control unit interface with a send key. Depression of the send key automatically triggers transmission of a block incoming call message from the call control unit to a central office. The block incoming call message includes information directing the central office to block incoming calls only until the establishment of the connection to the remotely located telephone.

A method for preventing loud ringing of a ringer on a handset of a telephone while the user is operating the telephone includes the steps of selecting one of two mute ringer modes: a reduced ringer volume mode and an alternate incoming call indicator mode. If the reduced ringer volume mode is selected, a power level output of the ringer on the telephone is reduced prior to establishing the connection to the remotely located telephone. The incoming call detector circuitry is maintained in an active state while the connection to the remotely located telephone is established. The connection to the remote telephone is established and the power level of the ringer is automatically increased to a level set prior to the reduction of the ringer power level upon either the establishment of the connection to the remotely located telephone or the termination of the connection. If the alternate incoming call indicator mode is selected, the ringer is disabled. Another incoming call indicator other than the ringer is enabled prior to the establishment of the connection to the remotely located telephone. Upon either the establishment of the connection or the termination of the connection, the ringer is re-enabled and the previously enabled incoming call indicator is disabled.

DETAILED DESCRIPTION

Figure 1:
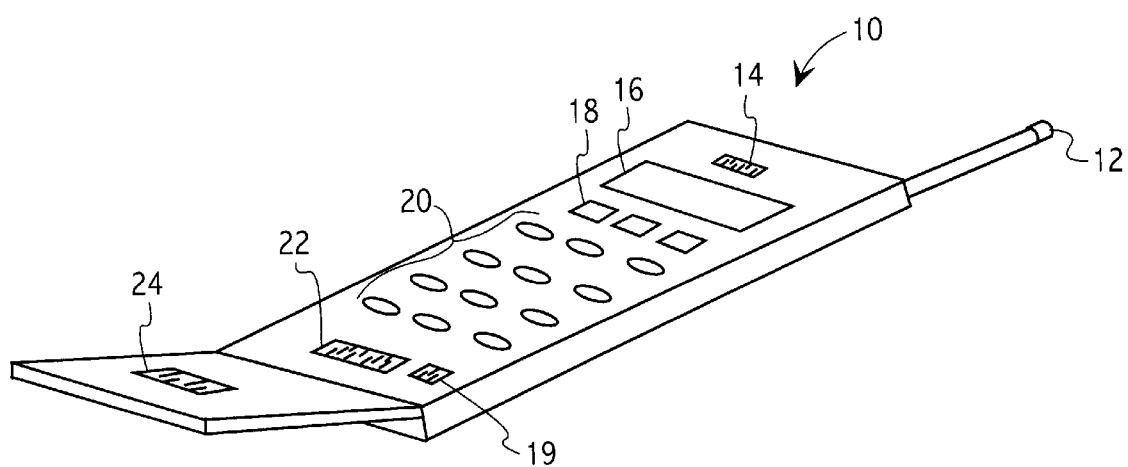
FIG. 1 is a perspective view of a cellular telephone having a mute ringer function according to the present invention.
Figure 2:
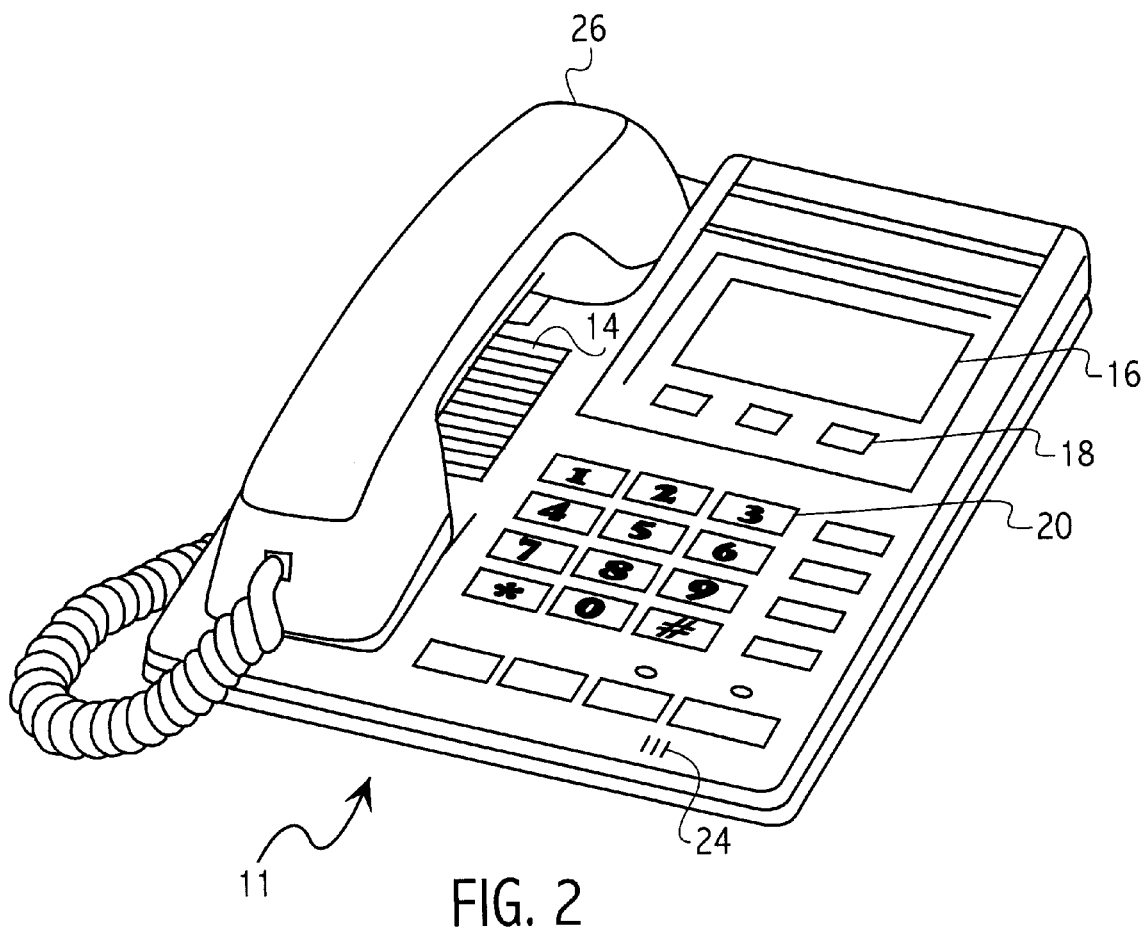
FIG. 2 is a perspective view of a landline telephone with two-line capability and having the same mute ringer function as the telephone of FIG. 1.

With reference to FIGS. 1 and 2, a cellular telephone 10 and a conventional telephone 11 having two-line capability are connected to a telephone network, such as an analog public switched network, an ISDN line, or a T-1 carrier. The cellular telephone 10 is shown as having an antenna 12 for transmitting voice and signaling information from the cellular telephone 10 to a central office or a relay station. Both the conventional telephone and the cellular telephone are equipped with a speaker 14 for presenting voice information to a user of the telephone. A visual display 16, such as an LCD, displays signaling information, such as caller identification and an outgoing dial string of a called endpoint. Additionally, the LCD 16 displays icons over the softkeys 18 which are indicative of functions, such as a mute ringer function assigned to one of the softkeys. Digit keys 20 are utilized to enter a dial string for transmission to a central office in order to establish a connection to a remote telephone. A send key 19 is provided to enable a user to transmit the dial string to the central office. A ringer, 22 in FIG. 1, not shown in FIG. 2, indicates reception of an incoming call. The ringer of the telephone illustrated in FIG. 2 is located on the handset 26 of the telephone. In either embodiment, the ringer may be either a mechanical or electrical mechanism that generates an audible indication in response to detection of an incoming call. A microphone 24 transmits voice information generated by the user.

Figure 3:
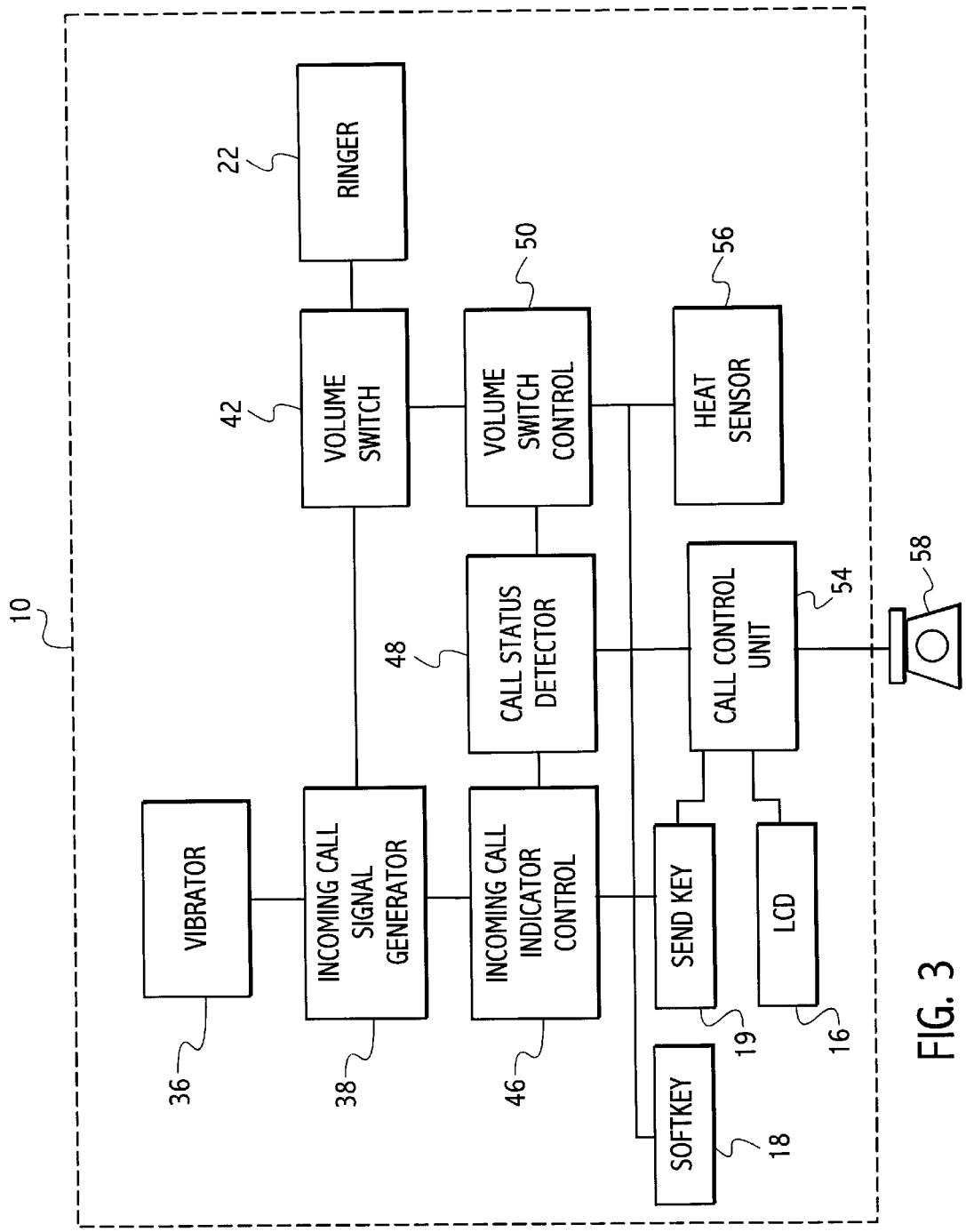
FIG. 3 is a block diagram showing the components of the telephones of FIGS. 1 and 2.

With reference to FIG. 3, a telephone is equipped with multiple incoming call indicators including a vibrator 36 and a ringer 22. The vibrator is a silent incoming call indicator which notifies the user of an incoming call through its vibrations, while the ringer produces audible ringer sounds to notify the user. Both the ringer 22 and the vibrator 36 are connected to an incoming call signal generator 38 which transmits signals to the vibrator 36 and the ringer 22 upon receipt of an incoming call. A volume switch 42 is located between the incoming call signal generator 38 and the ringer 22 for control of the ringer volume. The volume switch 42 can establish at least two alternative volume levels for the ringer 22. Preferably three different ringer volume levels can be selected; full volume, intermediate volume, and silenced. A volume switch control 50 is connected to the volume switch 42 to set the volume of the ringer 22. An incoming call indicator control 46 communicates with the incoming call signal generator 38 to indicate which of the incoming call indicators to activate upon reception of an incoming call. A call status detector 48 is connected to both the incoming indicator control 46 and the volume switch control 50 to communicate both the establishment of a connection between the telephone 10 and a remote telephone 58 and the termination of the connection. A call control unit 54 transmits and receives call signaling information to and from a central office, not shown, in addition to communicating with the call status detector 48 to provide call status information.

A user interface includes softkeys 18, a send key 19, an LCD 16, and a heat sensor 56. The softkeys can be assigned multiple functions, including selection of mute ringer modes. The send key is connected to the call control unit to trigger transmission of a dial string when depressed. Additionally, the send key 19 can be configured to communicate with the incoming call indicator control 46 to trigger selection of the vibrator 36 or to trigger a reduction of ringer volume through communication with the volume switch control 50.

Optionally, a heat sensor 56 is embedded on the surface of the earpieces of the telephones 10 and 11 to detect a threshold temperature. Alternatively, the heat sensor could be embedded in a portion of the telephone that contacts the hand of the user. If the threshold temperature is detected, a heat sensor circuit can be programmed to trigger a reduction in ringer volume or to trigger routing of incoming call signals to the vibrator 36 instead of the ringer 22. The softkey 18, the send key 19, and the heat sensor 56 are all connected to the call control unit 54, so that each can trigger transmission of a block incoming call message from the call control unit 54 to the central office.

With continued reference to FIGS. 1 through 3, prior to placing a call, the user can utilize one of the softkeys to choose between a reduced ringer volume mode and an alternate incoming call indicator mode. The reduced ringer volume mode reduces the ringer volume so that if a call is received on the cellular telephone 10 during the latency period when the user is monitoring the speaker for a response from a called party, the sounding of the ringer will not discomfort the user as intensely as if the ringer 22 were set at full volume. The reduced ringer volume mode operates in a similar fashion in the conventional telephone 11 with two-line capability when the user is on one line when a call is received on the other line. The ringer reduce volume mode reduces the volume of the ringer in the handset 26 to prevent loud ringing while the handset is placed near the user's ear.

The LCD 16 displays a reduced ringer volume icon over one softkey 18 and an alternate incoming call indicator icon over another softkey 18. Upon initial startup of the operation of the telephones 10 and 11, one of the two mute ringer functions is selected. The user can change the selection at any point. When the user of the cellular telephone 10 places a call, the user enters a dial string utilizing the digit keys 20 and then depresses the send key 19. The send key is dedicated to performing the send function. Alternatively, the send function might be assigned to one of the softkeys. In a preferred embodiment, the send key performs two different functions. Not only does depression of the send key trigger transmission of the dial string to the central office, but it also activates the selected mute ringer mode. The send key is connected to both the incoming call indicator control 46 and the volume switch control 50 to transmit signals activating the selected mute ringer mode.

If the reduce ringer volume mode has been selected, depression of the send key 19 triggers transmission of signals to the volume switch control 50. The volume switch control 50 in turn transmits signals to the volume switch 42 positioned between the incoming call signal generator 38 and the ringer 22. The volume switch 42, when activated by the volume switch control 50, causes the ringer 22 to ring at a reduced volume.

If the alternate incoming call indicator mode has been selected, depression of the send key 19 triggers transmission of signals to incoming call indicator control 46. The incoming call indicator control 46 transmits routing signals to the incoming call signal generator 38, instructing the incoming call signal generator to activate the vibrator 36 in the event that an incoming call is subsequently received. In this manner, the user automatically activates a previously selected mute ringer mode upon initiating a phone call without having to perform any operations other than those necessary to place the call. Furthermore, the user is still made aware of the incoming call, so that the user can choose to answer or ignore the call.

As an alternative to locally muting the ringer 22, the mute ringer function can also be performed at the central office of a telecommunications network in response to signals transmitted from the telephone to the central office. The call control unit 54 transmits a block incoming call message to the central office upon communication from either the send key 19. The block incoming call message contains information instructing the central office not to transmit incoming calls directed to the telephone until the current connection is terminated.

Optionally, the cellular telephone 10 and the handset 26 of the conventional telephone 11 have a heat sensor 56 embedded within a portion of the telephone contacted by the user which serves to detect when the user is handling the telephone. When the heat sensors 56 detect that a threshold temperature has been reached, the heat sensors signal either the volume switch control 50 or the incoming call indicator control 46 to activate the preselected mute ringer mode. The threshold temperature should be sufficiently above room temperature to minimize the susceptibility of the sensors to generating false readings. If the user is handling the telephone, it is reasonable to assume that the vibrator and the reduced ringer volume are both sufficient to notify the user of an incoming call. In this manner, the preselected mute ringer mode is activated automatically when the user handles the telephone 10 and 11.

The mute ringer function is intended to prevent loud ringing of the ringer 22 prior to establishment of a telephonic connection or during the call. In the cellular telephone embodiment, it is only necessary to mute the ringer during the latent period prior to establishing the connection to the remote telephonic device while the cellular telephone 10 is still capable of receiving telephone calls. Once the connection is established, the cellular telephone 10 can no longer receive incoming calls, and so the mute ringer function is unnecessary. In the conventional two-line telephone embodiment, the telephone 11 is still enabled to receive calls after the telephone 11 has established a connection. Therefore, in the conventional telephone embodiment, the mute ringer function is not disabled until the connection to the remote telephone is disconnected. A call status detector 48 is connected to the call control unit 54 to receive call status information. After the user has activated the preselected mute ringer function in the cellular telephone 10, the call status detector 48 monitors the call control unit 54 to detect the establishment of a connection to a remote telephone. When the connection is established, the call status detector 48 signals to either the incoming call indicator control 46 or the volume switch control 50 depending on which ringer mute mode is selected. If the alternative incoming call indicator mode is selected, then the incoming call indicator control 46 instructs the incoming call signal generator 38 to revert to routing incoming call signals to the ringer 22. If the reduced ringer volume mode is selected, the call status detector 48 signals to the volume switch control 50 to reset the volume switch 42 to the original volume. In the conventional two-line telephone embodiment, the call status detector 48 monitors the call control unit 54 to detect the termination of the connection to the remote telephone 58. Upon termination of the connection, the conventional telephone deactivates the selected mute ringer function in the same manner as the cellular telephone 10.

Figure 4:
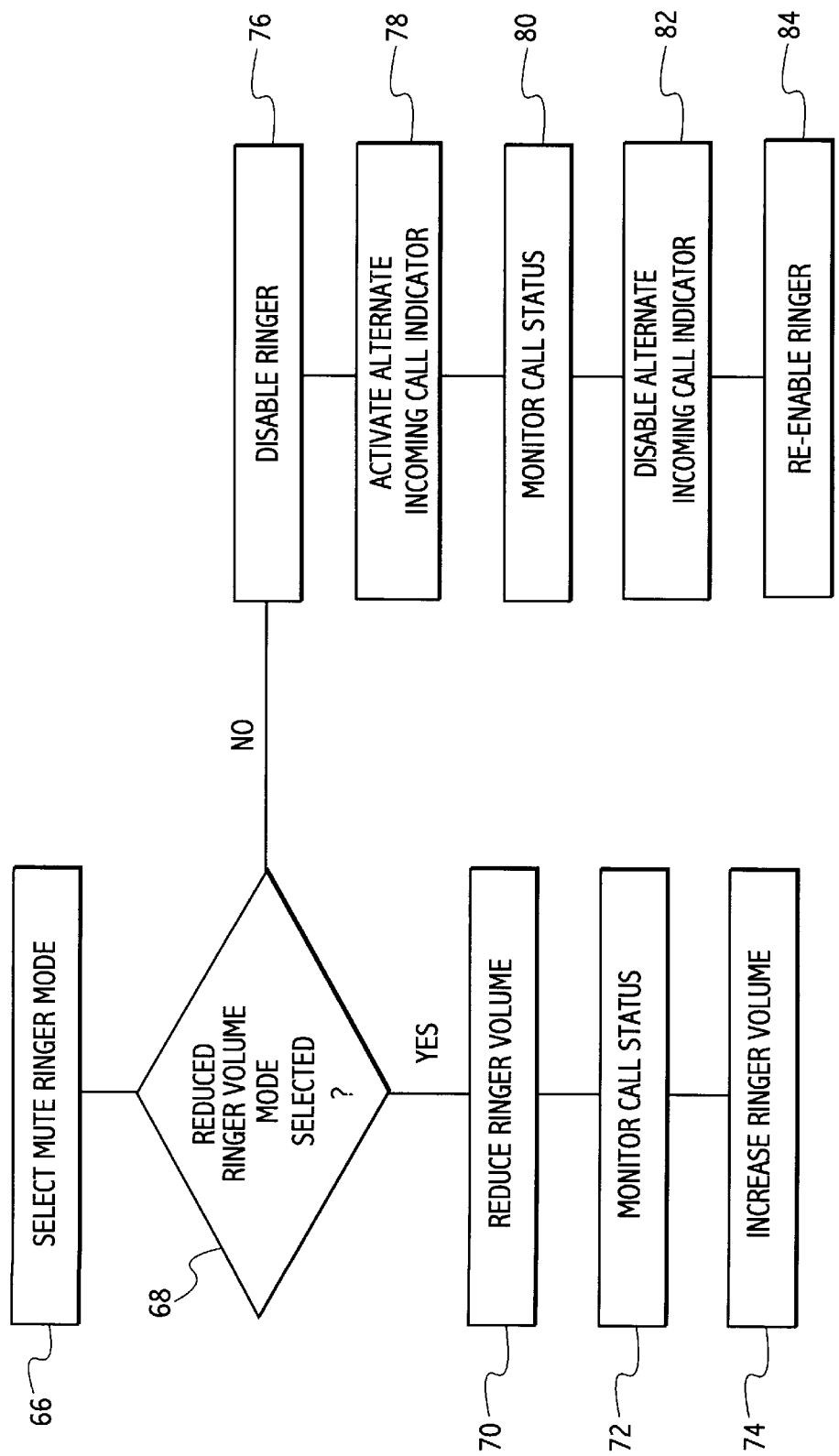
FIG. 4 is a flow diagram of a method for executing a mute ringer function of the present invention utilizing the telephone of FIGS. 1 or 2.

With reference to FIG. 4, a method for muting a telephone ringer 22 includes selecting a mute ringer mode in step 66. A user selects either a reduce ringer volume mode or an alternate incoming call indicator mode, both of which provide an alternative to a full volume ringer mode which can cause substantial discomfort if the ringer is activated while the user has the handset of the telephone to the user's ear. The user selects the mute ringer mode upon initial activation of the telephone, and the selection can be changed at any time. In step 68, it is determined whether the user selected the reduced ringer volume mode. If the reduced ringer volume mode was selected, then the ringer volume is reduced in step 70. Depression of the send key 19 triggers the volume switch control 50 to set the volume switch 42 at a reduced volume. If any incoming calls are subsequently received, the incoming call signals transmitted from the incoming call signal generator 38 are processed by the volume switch 42 prior to reaching the ringer 22, so that the volume of the ringer is decreased. The incoming call indicator circuitry, which includes the ringer 22 and the incoming call signal generator, is maintained in an active state in step 71 while the user is in the process of establishing a connection to a remote telephonic device. In step 72, a connection to the remote telephonic device is established. The call status detector 48 is utilized to monitor the status of the call in step 72. Upon either the establishment of a connection to a remote telephone or upon the termination of the connection, the call status detector 48 signals to the volume switch control 50. Upon reception of the signal from the call status detector 48, the volume switch control resets the volume switch 42 to the original volume setting in step 74.

If in step 68 it is determined that the alternative incoming call indicator mode was selected, the ringer 22 is disabled in step 76. The incoming call indicator control 46 directs the incoming call signal generator 38 to route incoming call signals to the vibrator 36 instead of the ringer 22 in step 78. Any number of other incoming call indicators could be substituted for the vibrator, such as a flashing light. Once the signal generator 38 has been configured to transmit incoming call signals to the vibrator 36, the call status detector 48 monitors the call control unit 54 to detect either connectivity to a remote telephone or the termination of the connection. Upon detecting either the connectivity or the termination, the call status detector 48 signals the incoming call indicator control 46. The incoming call indicator control in turn directs the incoming call signal generator 38 to route incoming call signals to the ringer 22 instead of the vibrator 36 in steps 82 and 84.

The above-described invention enables the user of a telephone having a ringer near the ear speaker and which is capable of receiving calls while the user is either awaiting a response from or connected to a called party to mute the ringer to avoid having the ringer disturbingly sound near the ear of the user. Advantageously, the ringer is automatically muted as a connection to a remote telephone is established, and the ringer mute is automatically disabled upon either the establishment of the connection or upon its termination.

What is claimed is:

1. A telephone with a ringer mute function comprising:
   detector circuitry that is responsive to detection of incoming calls, said detector circuitry remaining in an active state during a process of establishing connections for outgoing calls;
   a ringer that is cooperative with said detector circuitry to provide a first incoming call indicator having a plurality of power output levels, including a first output level and a second output level that is greater than said first output level;

means, responsive to commencement of said process of establishing said connections for said outgoing calls, for switching said first incoming call indicator to said first output level; and means for automatically resetting said first incoming call indicator to said second output level upon one of an establishment of said connections for said outgoing calls and a termination of said connections.

2. The telephone of claim 1 further comprising a second incoming call indicator and means for designating one of said first and second incoming call indicators prior to initiating a particular outgoing call, said designating means automatically reverting to a previously designated incoming call indicator upon detection of one of said process of establishing said connection for said particular outgoing call and termination of said connection.

3. The telephone of claim 2 wherein said designating means includes an incoming call indicator control connected to said detection circuitry and configured for routing incoming call signals to a designated incoming call indicator.

4. The telephone of claim 2 further comprising a call status detector connected to said resetting means and said designating means, said call status detector being configured for transmission of call status signals to said resetting means and said designating means upon said detection of one of an establishment of said connection for said particular outgoing call and said termination of said connection.

5. The telephone of claim 1 further comprising a heat sensor embedded in said telephone and connected to said switching means, said heat sensor being configured to transmit reduce power signals to said switching means upon detection of at least a threshold temperature.

6. The telephone of claim 1 wherein said switching means includes a call control unit communicatively connected to a call control unit interface with a send key, said switching means being configured to transmit a block incoming call message to a central office from said call control unit in response to manipulation of said send key.

7. The telephone of claim 1 wherein said switching means includes a volume switch located between said ringer and an incoming call signal generator.

8. The telephone of claim 7 further comprising a user interface having a send key connected to said volume switch to trigger transmission of volume reduction signals to said volume switch in response to manipulation of said send key.

9. A method for preventing loud ringing of a ringer on a telephone while a user is operating said telephone, said method comprising the steps of:

automatically reducing a power level output of said ringer on said telephone upon commencement of a process of establishing a connection to a remote telephonic device;

maintaining incoming call detector circuitry supporting said ringer in an active state during said process of establishing said connection to said remote telephonic device;

establishing said connection between said telephone and said remote telephonic device; and automatically increasing said ringer power level output upon detection of one of said establishment of said connection to said remote telephonic device and a termination of said connection.

10. The method of claim 9 further comprising the steps of:

selecting one of two mute ringer modes for implementation during periods of establishing connections for outgoing calls, said two mute ringer modes including a reduced ringer volume mode and an alternative incoming call indicator mode, said reduced ringer volume mode comprising said steps of reducing said power level output, maintaining said active state of said incoming call indicator circuitry, establishing said connection, and automatically increasing said ringer power level output;

if said alternative incoming call indicator mode is selected, disabling said ringer prior to establishing said connection to said remote telephonic device;

if said ringer is disabled, enabling an incoming call indicator other than said ringer prior to establishment of said connection to said remote telephonic device; and if said activation occurs, automatically re-enabling said ringer upon one of said establishment of said connection to said remote telephonic device and said termination of said connection.

11. The method of claim 10 further comprising the step of monitoring a heat sensor embedded in said telephone, detection of a threshold temperature by said heat sensor triggering said ringer disabling step.

12. The method of claim 10 further comprising the step of saving said selection made in said selecting step such that said selection becomes a default mute ringer mode.

13. The method of claim 10 wherein said automatic re-enabling step and said step of increasing said power output level include utilizing a call status detector to monitor said establishment of said connection to said remote telephonic device and said termination of said connection.

14. The method of claim 9 wherein said step of reducing said ringer power output level includes transmitting a message to a central office to block incoming calls until said connection is terminated.

15. The method of claim 9 wherein said ringer output level reducing step and said power output level increasing step both include automatically adjusting a power switch located between an incoming call signal generator and said ringer.

16. The method of claim 9 further comprising the step of monitoring a heat sensor embedded in said telephone, detection of a threshold temperature by said heat sensor triggering said ringer power output level reducing step.

17. A telephone with a mute ringer function comprising:

a plurality of call indicators including a ringer;

a volume switch connected to said ringer;

a call indicator control configured for selective activation of one of said call indicators other than said ringer prior to a connection of said telephone to a remote telephonic device, said call indicator control automatically reverting to said ringer upon termination of said connection;

a volume switch control configured for transmission of volume reduction signals to said volume switch prior to said remote telephonic connection, termination of said remote telephonic connection automatically triggering transmission of volume amplification signals from said volume switch control to said volume switch;

a user interface connected to said call indicator control and said volume switch control; and a call status detector configured for transmission of connect signals to one of said volume switch control and said call indicator control upon establishment of said telephonic connection, termination of said telephonic connection automatically triggering transmission of disconnect signals from said call status detector to said volume switch control and said call indicator control.

18. The telephone of claim 17 wherein said user interface includes a heat sensor in communicative contact with said volume switch control and embedded in an exterior portion of said telephone, said heat sensor being responsive to detection of a threshold temperature, detection of said threshold temperature automatically triggering transmission of volume reduction signals from said volume switch control.

19. The telephone of claim 17 further comprising a call control unit having an input and an output, said input being connected to said user interface, said output being configured for transmission of a block incoming call message.

* * * * *